May 19, 1959     W. M. DILLON     2,887,181
AIR LINE LUBRICATOR
Filed Sept. 18, 1956     3 Sheets-Sheet 1
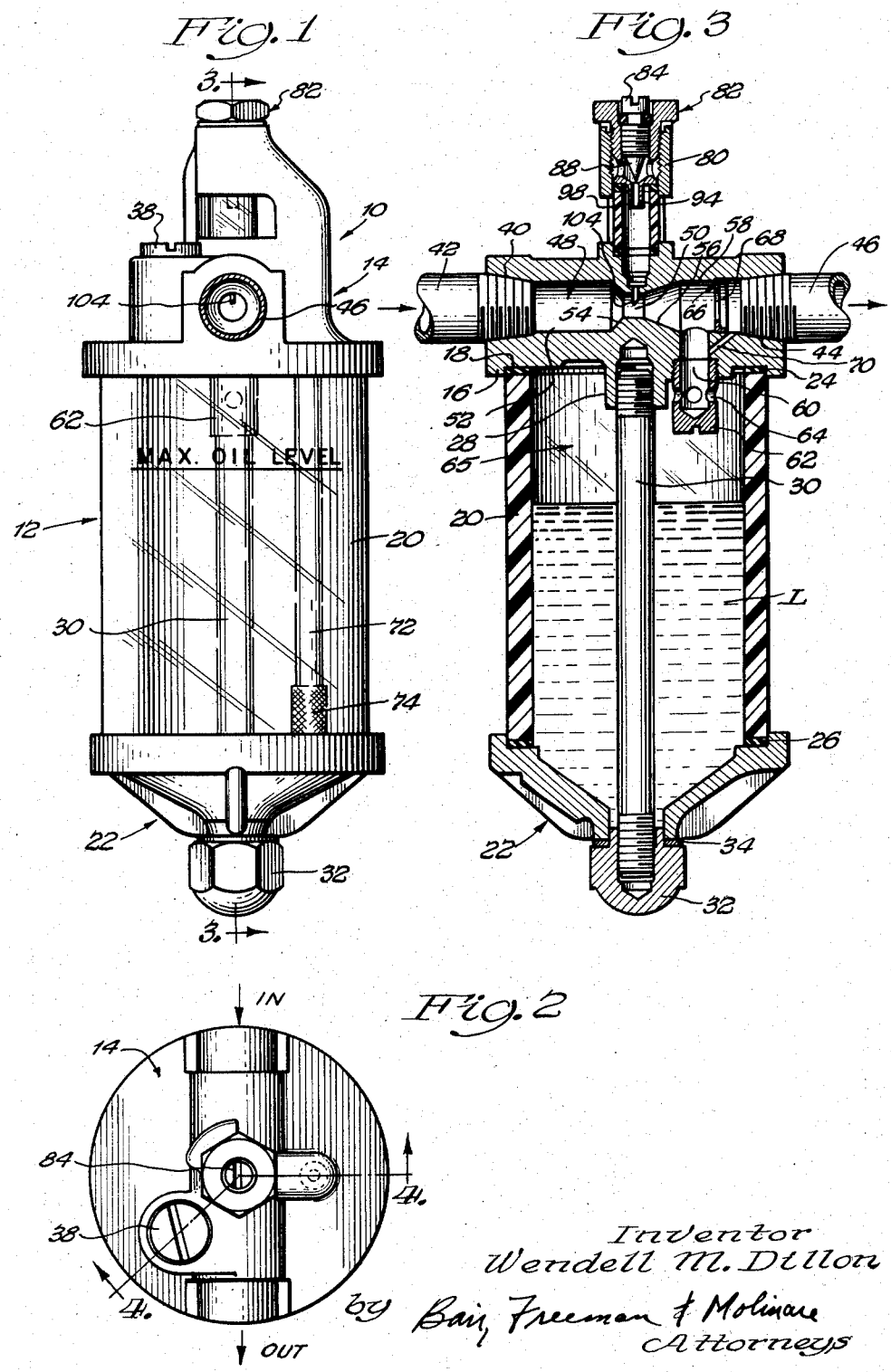
Inventor
Wendell M. Dillon
by Bair, Freeman & Molinare
Attorneys

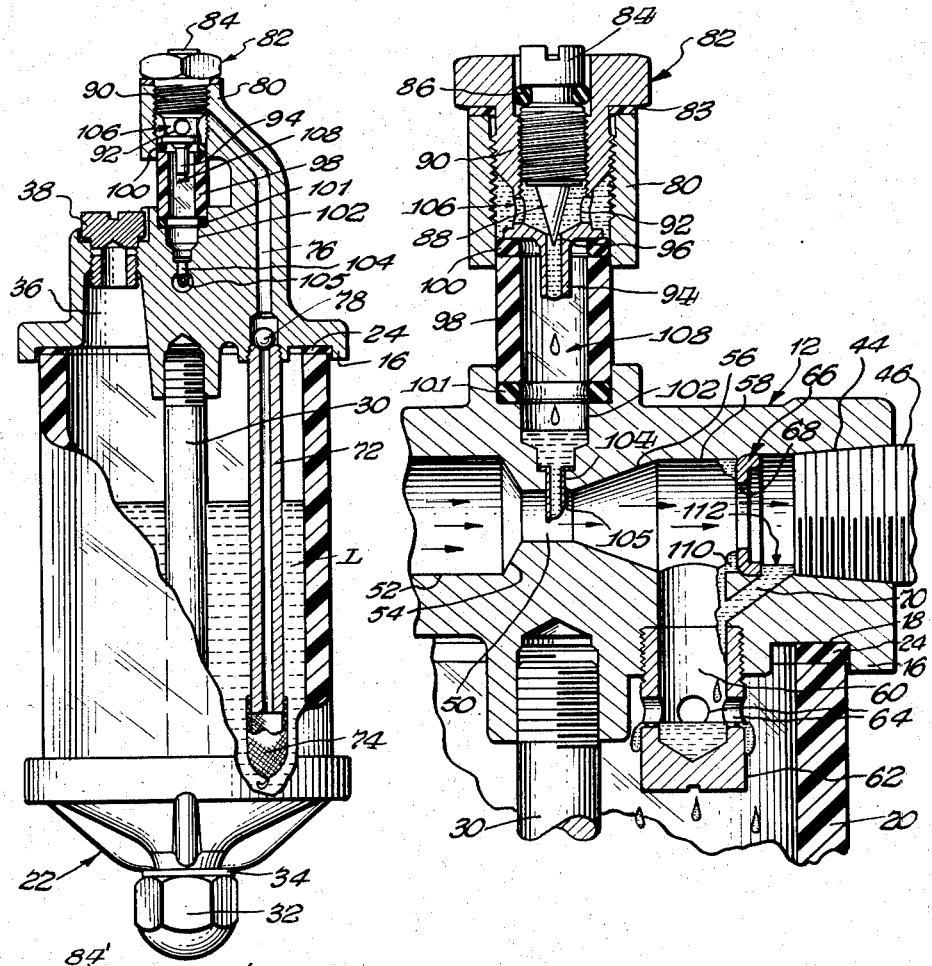

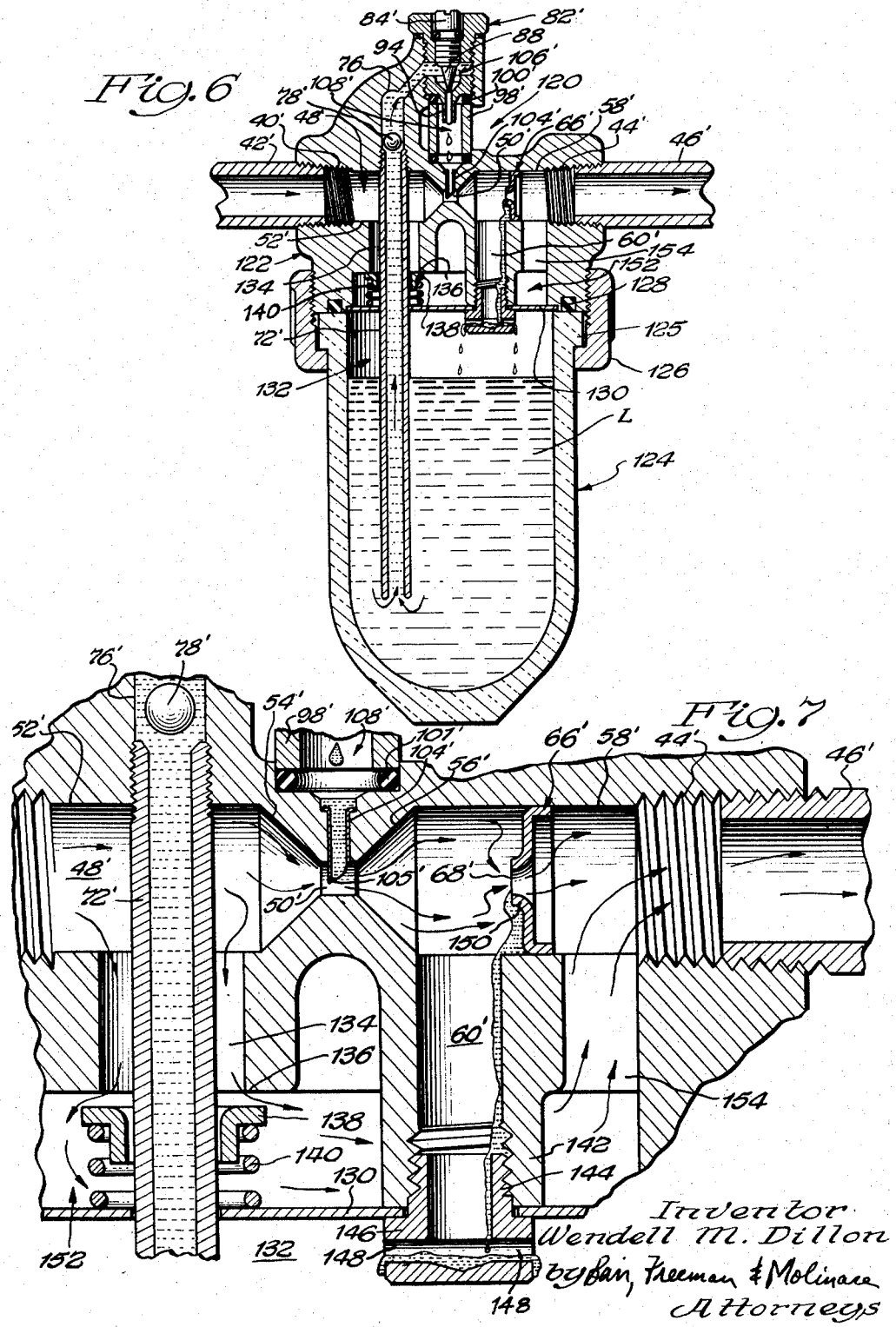

United States Patent Office 2,887,181
Patented May 19, 1959

2,887,181
AIR LINE LUBRICATOR

Wendell M. Dillon, North Andover, Mass., assignor to Watts Regulator Company, Lawrence, Mass., a corporation of Massachusetts Application September 18, 1956, Serial No. 610,606

15 Claims. (Cl. 184—55)

This invention relates to a lubricator for dispensing lubricant into a flowing stream of gas, and more particularly is directed to a lubricator for a compressed air line.

Use of lubricators of the general type herein described with compressed gas, or air, lines have been known for many years. However, many problems are attendant with use of prior lubricators, which problems are to be resolved by the invention herein disclosed.

Air line lubricators have been used in systems which utilize compressed air as the motive power for certain types of power tools. In such installations the flowing air also serves as a vehicle for transporting lubricant to the parts of the tools which are to be lubricated.

In installations which utilize air line lubricators, it is desirable to dispense the lubricant into the flowing air in as fine a state as possible. Preferably it is desired to produce a uniformly distributed fog, or aerosol, consisting of a dispersion of uniform sized, very fine particles of lubricant in the flowing air.

It is also a desirable end that an air line lubricator be operative to deliver lubricant to flowing gas, or air, over a wide range of gas flow rates. Frequently, air line lubricators utilize pressure differentials attained by the flowing gas as a force producing means which operates to feed the lubricant from a lubricant reservoir into the stream of flowing gas. However, such prior air line lubricators are deficient in that at low rates of air flow an insufficient amount of lubricant is dispensed to the flowing stream.

It is thus an important problem to provide an air line lubricator which is operative to supply lubricant to the flowing stream of gas over a wide range of rates of gas flow and particularly to obtain dispersing of lubricant promptly with initiation of flow of the air through the lubricator, since this is a particularly desirable time when lubricant is desired but when flow rates are usually low.

The obtaining of a true aerosol, or foglike dispersion, of lubricant in a stream of flowing air has been a very difficult problem. Prior air line lubricators invariably dispense lubricant particles of a great range of sizes. Another problem incident to such production of lubricant particles of varying sizes is the fact that large drops of lubricant tend to get larger by capturing adjacent fine particles, and the large drops often settle out of the flowing gas somewhere along the gas line before reaching the desired destination. Such operation is uneconomical, as a substantial portion of the dispensed lubricant fails to reach its ultimate objective.

From the foregoing, it will be appreciated that some of the requirements of a good air line lubricator are: (1) to produce a dispersion of lubricant in a fine uniform fog, or approaching a true aerosol condition; (2) obtaining substantial uniformity of particle size by eliminating large size particles of lubricant; (3) obtaining good atomization of the lubricant; (4) providing a supply of lubricant to the flowing gas promptly upon the initiating of the flow of gas; (5) obtaining substantial lubricant flow to the gas even at low rates of gas flow; (6) recovery of the large drops of lubricant and scavenging of the recovered lubricant back to the lubricant reservoir therefor; and (7) simplicity and economy of construction and design, and efficiency and reliability of operation.

Thus, one object of this invention is to provide a novel lubricator which substantially obviates the aforenoted problems and which also substantially meets the aforenoted requirements of a lubricator.

Another object of this invention is to provide a novel lubricator which is provided with means for intercepting the large size particles of lubricant that are carried by the flowing gas, and so as to deliver a fog or cloud, or aerosol, of lubricant particles of substantially uniformly fine size.

A further object of this invention is to provide a novel lubricator wherein large size particles of lubricant are separated out of the stream of flowing gas and are scavenged back to the reservoir for lubricant, thus reducing losses and increasing the economy and efficiency of operation.

Still another object of this invention is to provide a novel lubricator which utilizes pressure differentials obtained by the flowing gas to effect feeding of lubricant from a lubricant reservoir to the flowing gas, and which is provided with means for initiating feeding of lubricant to the flowing gas at very low gas flow rates, thereby increasing the operational flow rate range of the lubricator.

Still a further object of this invention is to provide a novel lubricator that is characterized by its simplicity and economy of construction and design, and by its efficiency and reliability of operation.

The above and other features of novelty which characterize the invention are pointed out with particularity in the claims annexed to and forming a part of this specification. For a better understanding of this invention, however, its advantages and specific objects attained by its use, reference is had to the accompanying drawing and descriptive matter in which is shown and described an illustrative embodiment of the invention.

Figure 1 is an elevational view of an air line lubricator constructed in accordance with this invention;

Figure 2 is a top plan view of the same;

Figure 3 is a cross-section view taken substantially on line 3—3 of Figure 1;

Figure 4 is a cross-section view taken substantially on line 4—4 of Figure 2, and shows more clearly certain details of the conduit means for the lubricator, which conduit means extends from the lubricant reservoir to the air flow passageway;

Figure 5 is greatly enlarged view of a fragment of Figure 3, and shows illustratively some of the features of operation of the novel lubricator;

Figure 6 is a cross-section view, similar to Figure 3, showing a modified and improved form of lubricator, said improved form containing additional improvement features over the lubricator disclosed in Figures 1 to 5;

Figure 7 is a greatly enlarged view of a fragment of Figure 6 showing certain of the structural and operational features of the improved lubricator of Figure 6;

Figure 8 is a fragmentary cross-section view of another modified form of lubricator.

Referring now to the drawings there is shown in Figures 1–5 a lubricator generally indicated at 10, which includes a lubricant reservoir 12 and a head 14 for said reservoir. The head 14 is provided with a downwardly depending annular shoulder 16, and an annular seat 18 located inwardly thereof. There is provided an annular, transparent, casing wall 20 for the reservoir, and a bottom closure member 22 for the lubricant reservoir. A sealing gasket 24 is provided between the upper edge of casing wall 20 and seat 18 in head 14; and a sealing gasket 26 is provided between the lower edge of casing wall 20 and the bottom closure member 22.

The head 14 is also provided with a central tapped boss 28. The entire structure is maintained assembled by means of an elongated bolt 30 which threads into tapped boss 28 and which carries, threaded to its lower end, a closure cap 32 which overlies a portion of bottom closure member 22. An appropriate sealing gasket 24 is provided between closure cap 32 and closure member 22.

There is provided an entrance to the interior of the lubricant reservoir through the entrance passageway 36 formed in head 14. The entrance passageway 36, through which additional lubricant may be introduced into the reservoir, is closed by means of a threaded closure cap 38.

The head 14 is also provided with a tapped inlet connection 40, to which a gas inlet pipe 42, is connected, and a tapped outlet connection 44, to which a threaded outlet pipe 46 is connected. Between inlet pipe 42 and outlet pipe 46, the head is formed to define a venturi flow passageway, generally indicated at 48, through which the gas is caused to pass. As in any venturi flow passageway, there is a throat section 50. With reference to throat 50, there is an upstream portion of the venturi flow passageway and a downstream portion of the venturi flow passageway. In particular, the venturi flow passageway 48 includes an upstream uniform flow portion 52, an upstream converging portion 54, a downstream diverging portion 56 and a downstream uniform flow portion 58.

There is further provided an upwardly extending gas-passageway means 60 which communicates to the venturi flow passageway, at the downstream uniform flow portion 58 thereof, and which passageway acts in part as a passageway through which scavenged lubricant is returned to the lubricant reservoir. The passageway 60 is formed in part, at its lower end, by a hollow threaded cap member 62 that is threaded into the head 14. Apertures 64 are provided adjacent the lower end of cap 62 to provide for passageway therethrough of gas, and of lubricant that has been scavenged by means hereinafter described. The apertures 64 in cap 62 are arranged above the maximum height of the lubricant L contained in the reservoir. Said apertures 64 thus open to a gas space 65 that is located between the upper level of lubricant L and the head 14 of the lubricator. While the passageway 60 is herein termed a "gas-passageway" it will be understood that there is little, if any, volumetric flow of gas therethrough. The passageway 60 serves to communicate the gas pressure from the venturi flow passageway 48 to the gas space 65 in the lubricant reservoir, or sump, and also serves as part of the scavenging passageway for the scavenged lubricant.

There is located in the downstream uniform portion 58, of venturi flow passageway 48, an annular abutment means 66 which serves as a restriction downstream of throat 50, or as a downstream constriction of the venturi flow passageway 48. The annular abutment means 66 surrounds a central aperture 68 through which flow of lubricant-carrying gas is maintained. The annular abutment means 66 is shown as being ring shaped, and may be properly located within venturi flow passageway 48 in any appropriate manner, for example as by press fitting or the like.

The head 14 is also formed to define an elongated sloping drain passageway 70. The upper end of said drain passageway 70 communicates with the venturi flow passageway 48 at a point downstream of the annular abutment means 66. The lower end of the drain passageway 70 communicates with the gas-passageway 60 which is located, preferably, upstream of the annular abutment means 66. Thus, there is provided a drain means which includes drain passageway 70 and gas-passageway 60 for scavenging intercepted lubricant back to the lubricant reservoir.

The means for feeding lubricant from the lubricant reservoir into the venturi flow passageway includes a dip tube 72 that is threaded to the head 14 and carried thereby, which dip tube 72 extends downwardly into the supply of lubricant L in the lubricant reservoir to a point adjacent the lower boundary of the reservoir. Preferably, a fine mesh filter cap 74 is provided at the lower end of the dip tube 72 to filter out any impurities that may be carried in the lubricant L. The upper end of dip tube 72 communicates with an upright lubricant conduit 76 which is defined in the head 14. Disposed in the lubricant conduit means, which includes the dip tube 72 and the lubricant conduit 76, is a ball type valve member 78 which is responsive to gravity and which acts as a check valve to prevent drainage of lubricant in conduit 76 back to the reservoir when the gas flow through the venturi passageway 48 has been cut off. The maintaining of lubricant in passageway 76 insures that lubricant will be readily available when the lubricator initiates operation.

The upper end of lubricant passageway 76 opens into the central bore of an annular boss 80 which is carried by head 14 centrally thereof and is spaced above the portion of head 14 wherein is located the throat 50 of the venturi flow passageway 48. The boss 80 is threaded to receive an annular cap 82. A gasket 83 provides a sealing closure between cap 82 and boss 80. The annular cap 82 carries therein a valve member 84 that has a slotted head adapted to receive a screw driver, or the like, for effecting valve adjustments. An O-ring 86 provides a seal between valve member 84 and annular cap 82. The lower end of valve member 84 is shaped to define a tapered needle valve 88.

The annular cap 82 is shaped to define a tubular shank portion 90 which has lateral apertures 92 formed therein. The lower terminal end of tubular shank 90 carries a downwardly depending central discharge tube 94 which also serves to define a valve seat 96 for cooperation with the tapered needle valve 88.

Located in the space between boss 80 and head 14 is a transparent tubular member 98 through which dispensing of lubricant from the lower end of discharge tube 94 may be viewed. An appropriate sealing gasket 100 is provided between the upper edge of tubular member 98 and shank 90 of cap 82, and an appropriate sealing gasket 101 is provided between the lower edge of tubular member 98 and head 14. The head 14 is provided with a bore 102 therein adapted to receive lubricant from the discharge tube 94. The bore 102 is fitted with an upright lubricant dispensing tube 104 which extends downwardly into the throat 50 of the venturi flow passageway 48, and extends substantially to the center of the throat 50. The lubricant dispensing tube 104 is provided with a bevel 105 at the lower terminal end thereof, and the beveled terminal edge of tube 104 is arranged to face in a downstream direction relative to the direction of flow of gas through the venturi flow passageway 48.

The annular space between tubular shank 90 of cap 82 and boss 80 defines a first lubricant receiving chamber, generally indicated at 106. The space between the lubricant discharge tube 94 and the lubricant dispensing tube 104 defines a second lubricant receiving chamber, generally indicated at 108.

In the operation of the device thus far described, the flow of gas through the venturi flow passageway 48 achieves its greatest velocity in the throat 50. At the same time, the static pressure head in throat 50 is the lowest any place along the venturi flow passageway 48. This means that the static pressure head in the uniform flow passageway 58 is higher than the static pressure head in the throat 50 of the venturi flow passageway. This higher pressure in passageway portion 58 is communicated through gas-passageway 60 and apertures 64 to the lubricant L in the reservoir. The static pressure head differential between the downstream portion 58 and the throat 50 causes flow of lubricant through the lubricant conduit means therefor. The lubricant conduit means includes dip tube 72, lubricant conduit 76, first lubricant receiving chamber 106, lubricant discharge tube 94, second lubricant receiving chamber 108, and lubricant dispensing tube 104.

The fact that the lubricant is dispensed into the venturi flow passageway at the point of greatest gas velocity contributes to a very fine atomization of the dispensed lubricant by the flowing gas. Thus is further enhanced by the dispensing of lubricant at a point substantially centrally of the throat 50 of the venturi. Generally, when the device is properly adjusted, the dispensed lubricant is substantially fully and completely atomized and there is very little need for scavenging of excess lubricant. However, there may be instances of improper feeding, or instances of inefficient atomization of the dispensed lubricant, when atomization of the dispensed lubricant is not completely uniform or as fine as desired, and there may be some large lubricant particles which pass into the stream of gas. Such large particles of lubricant tend to move outwardly toward the outer boundaries of the flow passageway. Thus the abutment means 66, located downstream of venturi throat 50, becomes operative to intercept and separate, from the flowing gas, the greater portion of large size particles of lubricant. On the other hand, the fine particles of lubricant, being more easily air borne, pass with the flowing gas around the obstruction caused by the abutment means 66, and passes with the flow of air through the central aperture 68 and then to the outlet pipe 46.

Figure 5 illustrates the manner in which the abutment means 66 operates to intercept and separate lubricant from the flow of gas. It will be seen that a portion of the intercepted lubricant, indicated at 110, may be scavenged upstream of the abutment means 66, while another portion of the intercepted lubricant, indicated at 112, may be scavenged downstream of the abutment means 66. The drain passageway 70 serves to drain the scavenged lubricant 112 back through gas-passageway 60 into the lubricant reservoir.

In the improved form of the device shown in Figures 6 and 7 there is shown a lubricator, generally indicated at 120, and including a head 122 and a reservoir 124. The upper end of reservoir 124 is flanged at 125. A flanged collar 126 is threaded to an annular portion of head 122 and is adapted to engage the reservoir 124 by the flange 125 thereof for the purpose of securing the reservoir to the head. An appropriate sealing member 128 is provided between head 122 and reservoir 124.

Interposed between the head 122 and the lubricant L in the reservoir, there is provided a baffle plate 130 which is spaced above the maximum level that the lubricant L attains in the reservoir. There is thus formed between the baffle plate 130 and the upper level of lubricant L a gas-space 132. The baffle plate 130 cooperates with other portions of the reservoir and with the head 122 to effectively separate the gas-space 132, below the baffle 130, from the space above the baffle 130.

The elements of the lubricator of Figures 6 and 7 which are similar to elements of the lubricator shown in Figures 1 to 5, carry the same reference numeral with the addition of a prime (′) mark. The features of improvement in the lubricator of Figures 6 and 7 over the lubricator of Figures 1–5 will be readily apparent upon comparison of said figures.

Thus, in Figures 6 and 7, the head 122 is provided with a venturi flow passageway 48′ which has a throat 50′. However, the throat 50′ of the venturi flow passageway is of unusually small size, and is of a selected size that is smaller than the size required to pass the maximum gas carrying capacity of the inlet and outlet portions of the venturi flow passageway 48′. In other words, the throat 50′ will choke, or provide sufficient resistance to gas flow therethrough, so as to limit the amount of gas passed therethrough to an amount less than the maximum flow which could be carried by the inlet and outlet pipes 42′ and 46′.

The dip tube 72′, which serves as a portion of the conduit for the lubricant from the lubricant reservoir to the means for dispensing the lubricant into the flowing gas, is located to pass upwardly through and above the baffle plate 130, and then passes centrally through an upright passageway 134 which is formed in the head member 122. The passageway 134 communicates with the uniform flow portion 52′ of the venturi flow passageway 42′.

The head 122 is shaped to define and provide a valve seat 136 at the lower end of passageway 134. There is provided an annular valve member 138, surrounding dip tube 72′ and guided thereby, adapted to be seated on valve seat 136 so as to seal off the annular passageway defined between dip tube 72′ and the spaced wall of passageway 134. A coil spring 140, surrounding dip tube 72′, is positioned between valve member 138 and baffle plate 130, and is operative to normally bias valve 138 to a position against valve seat 136 so as to normally close said annular passageway.

The head 122 is also shaped to define a downwardly extended boss 142 which defines in part a gas-passageway 60′. The lower end of boss 142 is threaded to receive a threaded tubular stud 144 of a headed member 146. The headed member 146 is apertured at 148 to communicate gas-passageway 60′ to the gas space 132. The baffle plate 130 is clamped in position between the lower terminal end of boss 142 and the head of headed member 146, in the manner shown in Figures 6 and 7.

Within the venturi flow passageway 48′ is positioned an annular abutment means 66′ having a central aperture 68′ defined therein. The abutment means 66′ also defines an annular central flange means 150 which extends generally upstream of the abutment means 66′, and which operates to assist in directing the scavenged flow of intercepted lubricant in the manner as best shown in Figure 7, so that the scavenged lubricant will pass through gas-passageway 60′ and then through apertures 148 back to the supply of lubricant within the lubricant reservoir.

The head 122, and portions thereof, are shaped, formed, and spaced relative to the baffle plate 130 so as to define a by-pass passageway between the inlet and outlet connections of the lubricator, and around the throat 50′ of the venturi flow passageway 48′. This by-pass passageway includes: (1) the passageway 134 which communicates with the upstream uniform flow portion 52′ of venturi passageway 48′; (2) the gas space above the baffle plate 130, generally indicated at 152; (3) an upright passageway 154 which communicates gas space 152 with the downstream uniform flow portion 58′ of the venturi flow passageway 48′, at a point downstream of the annular abutment means 66′.

The by-pass passageway means operates to supply additional gas to the outlet connection 46′ when the demand for gas at said outlet connection exceeds a predetermined amount, which predetermined amount is related to the amount of gas that may be passed through the constricted throat 50′.

The valve member 138 is normally closed by the bias of spring 140 so that the initial flow of gas is through the throat 50′ of venturi flow passageway 48′. The bias of spring 140 is so selected that, upon a preselected pressure difference being obtained in response to demand for gas, said valve 138 opens to allow flow of additional gas through the by-pass passageway means from the inlet connection to the outlet connection. The by-passed gas, upon re-entering the venturi flow passageway 48′ from passageway 154, mixes with the lubricant carrying gas that has passed through throat 50′, so that the resultant gas entering outlet pipe 46′ is a lubricant bearing gas, By providing an extremely small throat 50' in the venturi flow passageway 48', even at very low rates of gas flow there is caused to be a sufficient drop in static pressure in throat 50' to cause feeding of lubricant to the gas passing therethrough, and thus the lubricator herein disclosed is operative to supply lubricant, not only at normal flow rates of gas, but also at very low flow rates of gas.

While the lubricators hereinabove described include a scavenging function, it should be understood that the scavenging function is not dictated by inefficiency of the lubricator but, rather, serves the need where such scavenging function is required. Actually, the lubricators of the type hereinabove described have an unusually high efficiency, in the dispensation of lubricant into the flow of compressed air passing therethrough, as compared with other existing lubricators. The only time that the scavenging function becomes of real measurable value is where the rate of feed of lubricant is excessive for the amount of air flowing, and this excess can be materially reduced by adjustment of the feed executed by an operator. However, the scavenging means does provide a safeguard against excessive lubricant feeding, through failure of an operator to correctly regulate the lubricant flow when putting the device into operation. Tests have indicated that except for careless adjustment, the lubricators of the type hereinabove described will operate to use almost 100% of the dispensed lubricant.

In the modified form of lubricator shown in Figure 8, it will be seen that a number of the parts are similar to the parts shown in Figure 6. The parts in Figure 8 which are similar to those shown in Figure 6 have retained the same reference numbers as in Figure 6. In the form shown in Figure 8, the venturi flow passageway 48a is somewhat modified in that the upstream converging section has been eliminated. To compensate for eliminating the upstream converging section of the venturi, the throat section 50a is elongated relative to the throat section of the venturi shown in Figure 6.

In addition to the foregoing, there is provided a downwardly extending flow passageway 200 which opens to the venturi flow passageway 48a at a point upstream of the throat section 50a. The said downwardly extending flow passageway 200 serves, in part, the same purpose as gas passageway 134 shown in Figure 6 and communicates with the gas space 152 that is formed above the baffle plate 130, which space 152 communicates through upright gas passageway 154 with the venturi flow passageway 48a at a point downstream of the throat 50a thereof.

A tapered valve member 138a is provided for sealing against the valve seat 136a formed in the head member of the lubricator. The baffle 130 is provided with a gasket 131 on the upper side thereof, and a speed nut, or gripping nut, 133 is provided on the under side of the baffle plate 130 for gripping the periphery of the dip tube 72a.

In addition to the foregoing modifications, the head of the lubricator is shaped and formed to provide a by-pass passageway 202 which communicates, at one end, with the flow passageway 200 at a point upstream of the valve seat 136a, and, at the other end, communicates with an upright gas passageway 204 and then through apertures 206 into the gas space 132 which is located above the upper level of the lubricant within the reservoir 124. The foregoing arrangement is such that the incoming gas pressure, from upstream the throat 50a of the venturi passageway, is communicated, by the aforesaid gas-passageway means, to the interior of the gas space 132 regardless of whether or not the valve member 138a is seated. This provides for the imposing of the total gas inlet pressure onto the lubricant within the lubricant reservoir. With this arrangement the oil or lubricant within the reservoir 124 can be raised to a much greater height and, therefore, a much deeper reservoir 124 may be used, which lends itself to high capacity oil feeding and extends the period of use between successive refills. This modification also lends itself to operating under conditions where high rates of lubricant feed are required and where a more highly saturated gas stream is required.

In this last modified form it will be seen that the scavenging of oil from the downstream portion of the venturi flow passageway 48a is not a requisite function and accordingly the scavenging passageway between the venturi flow passageway and the lubricant reservoir has been eliminated. However, the baffle 66a, which is positioned within the downstream flow portion of the venturi flow passageway 48a, may or may not be used, depending on the particular application. When used, the baffle 66a will still operate to separate out of the gas stream those large droplets of lubricant which are not desired to be passed.

Thus it will be seen that there is provided an improved lubricator which delivers a fog of lubricant of more uniform lubricant particle size, and which operates to scavenge and recover larger size lubricant particles, and which is operative to deliver a lubricant flow over a large range of gas flow rates including very low gas flow rates.

While the instant invention has been described for use as a gas line lubricator, and more particularly as an air line lubricator, it will be understood that this invention may also be used where any air or gas stream is required to entrain and carry some liquid suspension in a mist form. Therefore, as used herein and in the claims hereof, the term "lubricator" is intended to refer to any device for entraining any liquid in mist form in a flowing stream of gas or air and the term "lubricant" refers to the liquid so entrained.

Changes may be made in the construction and arrangement of parts of my device without departing from the real spirit and purpose of my invention, and it is my intention to cover by my claims any modified forms of structure or use of mechanical equivalents which may be reasonably included within their scope.

I claim as my invention:

1. A lubricator comprising, in combination, a lubricant reservoir, a head for the reservoir, means in said head defining gas inlet and outlet connections, means in said head defining a venturi flow passageway for gas between said inlet and outlet connections, means defining a conduit for lubricant from said lubricant reservoir to the throat of the venturi flow passageway at which throat the velocity of gas passing through said flow passageway is a maximum, gas-passageway means communicating with the venturi flow passageway downstream of the throat thereof and communicating the gas in the venturi passageway to the lubricant reservoir, to effect feeding of lubricant through the conduit therefor from the reservoir to the throat of the venturi flow passageway, and annular abutment means disposed in said venturi flow passageway downstream of the venturi throat defining a constricted flow passageway disposed centrally and coaxially of said venturi flow passageway and through which lubricant carrying gas is caused to flow at locally increased velocity, but lower than the gas velocity in said venturi throat, and said annular abutment means intercepting, and separating from the passing gas, a portion of the lubricant carried by said gas.

2. A lubricator comprising, in combination, a lubricant reservoir, a head for the reservoir, means in said head defining gas inlet and outlet connections, means in said head defining a venturi flow passageway for gas between said inlet and outlet connections, means defining a conduit for lubricant from said lubricant reservoir to the throat of the venturi flow passageway at which throat the velocity of gas passing through said flow passageway is a maximum, gas-passageway means communicating with the venturi flow passageway downstream of the throat thereof and communicating the gas in the venturi passageway to the lubricant reservoir, to effect feeding of lubricant through the conduit therefor from the reservoir to the throat of the venturi flow passageway, means defining a constriction in the portion of the venturi flow passageway downstream of the venturi's throat, defining a constricted flow passageway disposed centrally and coaxially of said venturi flow passageway and through which lubricant carrying gas is caused to flow at locally increased velocity, but lower than the gas velocity in said venturi throat, and said annular abutment means, intercepting, and separating from the passing gas, a portion of the lubricant carried by the gas, and drain means for returning said lubricant separated from the gas to the lubricant reservoir, said drain means including an elongated inclined drain passageway communicating at its upper end thereof with the venturi flow passageway at a point downstream of the constriction therein, and the lower end of said upright drain passageway communicating with said gas-passageway means which communicates the venturi flow passageway to the lubricant reservoir.

3. A lubricator comprising, in combination, a lubricant reservoir, a head for the reservoir, means in said head defining gas inlet and outlet connections, means in said head defining a venturi flow passageway for gas between said inlet and outlet connections, means defining a conduit for lubricant from said lubricant reservoir to the throat of the venturi flow passageway at which throat the velocity of gas passing through said flow passageway is a maximum, gas-passageway means communicating with the venturi flow passageway downstream of the throat thereof and communicating the gas in the venturi passageway to the lubricant reservoir, to effect feeding of lubricant through the conduit therefor from the reservoir to the throat of the venturi flow passageway, annular abutment means downstream of the venturi throat for intercepting, and separating from the passing gas, a portion of the lubricant carried by said gas, and a flange on said abutment means extending upstream thereof for assisting to direct the scavenging flow of the intercepted lubricant.

4. In a lubricator of the character described; a lubricator head defining therein a venturi flow passageway for a flow of compressed gas, said venturi flow passageway having a throat through which gas flows at its maximum velocity along said flow passageway; a reservoir for lubricant; means connecting said reservoir to said head; a gas-passageway connecting the venturi flow passageway, downstream of the throat thereof, to said lubricant reservoir; means for dispensing lubricant from said lubricant reservoir into the throat of said venturi flow passageway; a restriction in said venturi flow passageway downstream of the throat of said venturi passageway for intercepting, and separating from the passing gas, a portion of the lubricant carried by the gas; and means in said lubricator head defining a by-pass passageway for by-passing a portion of the compressed gas which enters the lubricator head from a point upstream the throat of the venturi flow passageway to a point downstream of said lubricant intercepting restriction in the flow passageway.

5. In a lubricator of the character described; a lubricator head defining therein a venturi flow passageway for a flow of compressed gas, said venturi flow passageway having a throat through which gas flows at its maximum velocity along said flow passageway; a reservoir for lubricant; means connecting said reservoir to said head; a gas-passageway connecting the venturi flow passageway, downstream of the throat thereof, to said lubricant reservoir; means for dispensing lubricant from said lubricant reservoir into the throat of said venturi flow passageway; a restriction in said venturi flow passageway downstream of the throat of said venturi passageway for intercepting, and separating from the passing gas, a portion of the lubricant carried by the gas; means in said lubricator head defining a by-pass passageway for by-passing a portion of the compressed gas which enters the lubricator head from a point upstream the throat of the venturi flow passageway to a point downstream of said lubricant intercepting restriction in the flow passageway; and normally closed valve means in said by-pass passageway being operative to open under a predetermined pressure differential of the flowing gas.

6. A lubricator comprising, in connection a lubricant reservoir, a head connected to said reservoir, means in said head defining gas inlet and outlet connections, means in said head defining a venturi flow passageway between said inlet and outlet connections, the throat of said venturi being smaller than that required to pass the maximum gas carrying capacities of the inlet and outlet connections, and means in said head defining a by-pass passageway for by-passing a portion of the gas, passing through the head between said inlet and outlet connections, around the throat of said venturi, for supplying additional gas when the demand for gas at the outlet connection exceeds the amount that may be passed by the venturi's throat.

7. A lubricator comprising, in combination, a lubricant reservoir, a head connected to said reservoir, means in said head defining gas inlet and outlet connections, means in said head defining a venturi flow passageway between said inlet and outlet connections, the throat of said venturi being smaller than that required to pass the maximum gas carrying capacities of the inlet and outlet connections, means in said head defining a by-pass passageway for by-passing a portion of the gas, passing through the head between said inlet and outlet connections, around the throat of said venturi, for supplying additional gas when the demand for gas at the outlet connection exceeds the amount that may be passed by the venturi's throat, and normally closed valve means in said by-pass passageway being operative to open when the demand for gas at the outlet connection exceeds a predetermined amount.

8. A lubricator comprising, in combination, a lubricant reservoir, a head connected to said reservoir, means in said head defining gas inlet and outlet connections, means in said head defining a venturi flow passageway between said inlet and outlet connections, the throat of said venturi being smaller than that required to pass the maximum gas carrying capacities of the inlet and outlet connections, a baffle positioned across said lubricant reservoir and spaced above the maximum level of lubricant in said reservoir, thereby defining a gas space below the baffle and above the lubricant in the reservoir, gas passageway means communicating the venturi flow passageway, downstream of its throat, with said gas space between the baffle and the lubricant, lubricant conduit means for delivering lubricant from the reservoir to the throat of the venturi flow passageway, and means including said baffle defining a by-pass passageway between said inlet and outlet connections, and around the throat of said venturi, for supplying additional gas when the demand for gas at the outlet connection exceeds a predetermined amount.

9. A lubricator comprising, in combination, a lubricant reservoir, a head connected to said reservoir, means in said head defining gas inlet and outlet connections, means in said head defining a venturi flow passageway between said inlet and outlet connections, the throat of said venturi being smaller than that required to pass the maximum gas carrying capacities of the inlet and outlet connections, a baffle positioned across said lubricant reservoir and spaced above the maximum level of lubricant in said reservoir, thereby defining a gas space below the baffle and above the lubricant in the reservoir, gas-passageway means communicating the venturi flow passageway, downstream of its throat, with said gas space between the baffle and the lubricant, lubricant conduit means, including an upright tube passing upwardly through and above said baffle, for delivering lubricant from the reservoir into the throat of the venturi flow passageway, means including said baffle defining a by-pass gas flow passageway between said inlet and outlet connections, means including said upright tube defining an annular segment of said by-pass passageway, an annular valve member mounted on said upright tube for concentric movement with respect thereto, said tube cooperating to guide the movement of said valve member, and said valve member being operative to normally close said by-pass passageway.

10. A lubricator comprising, in combination, a lubricant reservoir, a head connected to said reservoir, means in said head defining gas inlet and outlet connections, means in said head defining a venturi flow passageway between said inlet and outlet connections, the throat of said venturi being smaller than that required to pass the maximum gas carrying capacities of the inlet and outlet connections, a baffle positioned across said lubricant reservoir and spaced above the maximum level of lubricant in said reservoir, thereby defining a gas space below the baffle and above the lubricant in the reservoir, gas passageway means communicating the venturi flow passageway, downstream of its throat, with said gas space between the baffle and the lubricant, lubricant conduit means, including an upright tube passing upwardly through and above said baffle, for delivering lubricant from the reservoir into the throat of the venturi flow passageway, means including said baffle defining a by-pass gas flow passageway between said inlet and outlet connections, means including said upright tube defining an annular segment of said by-pass passageway, an annular valve member mounted on said upright tube for concentric movement with respect thereto, said tube cooperating to guide movement of said valve member, a coil spring between said baffle and valve member normally biasing said valve member to a position to close said annular segment of said by-pass passageway, and said biased valve member being responsive to a preselected pressure difference to open to permit flow of gas through said by-pass passageway.

11. A lubricator comprising, in combination, a lubricant reservoir, a head connected to said reservoir, means in said head defining gas inlet and outlet connections, means in said head defining a venturi flow passageway between said inlet and outlet connections, the throat of said venturi being smaller than that required to pass the maximum gas carrying capacities of the inlet and outlet connections, said venturi throat being the point at which maximum gas velocity is attained in said venturi flow passageway, means in said head defining a by-pass passageway for by-passing a portion of the gas, passing through the head between said inlet and outlet connections, around the throat of said venturi, for supplying additional gas when the demand for gas at the outlet connection exceeds a predetermined amount, and a restriction in said venturi flow passageway downstream of the throat thereof defining a constricted flow passageway disposed centrally and coaxially of said venturi flow passageway and through which lubricant carrying gas is caused to flow at locally increased velocity, but lower than the gas velocity in said venturi throat, and said annular abutment means intercepting, and separating from passing gas, a portion of the lubricant carried by said gas.

12. A lubricator comprising, in combination, a lubricant reservoir, a head connected to said reservoir, means in said head defining gas inlet and outlet connections, means in said head defining a venturi flow passageway between said inlet and outlet connections, the throat of said venturi being smaller than that required to pass the maximum gas carrying capacities of the inlet and outlet connections, said venturi throat being the point at which maximum gas velocity is attained in said venturi flow passageway, means in said head defining a by-pass passageway for by-passing a portion of the gas, passing through the head between said inlet and outlet connections, around the throat of said venturi, for supplying additional gas when the demand for gas at the outlet connection exceeds a predetermined amount, a restriction in said venturi flow passageway downstream of the throat thereof defining a constricted flow passageway disposed centrally and coaxially of said venturi flow passageway and through which lubricant carrying gas is caused to flow at locally increased velocity, but lower than the gas velocity in said venturi throat, and said annular abutment means intercepting, and separating from the flowing gas, a portion of the lubricant carried by said gas, and drain means for scavenging the lubricant separated from the gas by the restriction to the lubricant reservoir.

13. In a lubricator of the character described; means defining a venturi flow passageway for a flow of compressed gas; a reservoir for lubricant; gas-passageway means connecting the venturi flow passageway, upstream of the throat thereof, to said lubricant reservoir to pressurize the lubricant in said reservoir; means for dispensing lubricant from said lubricant reservoir into the throat of said venturi flow passageway at which point the gas velocity is the maximum attained in said venturi flow passageway; and a restriction in said venturi flow passageway, downstream of the throat of the venturi flow passageway, defining a constricted flow passageway disposed centrally and coaxially of said venturi flow passageway and through which lubricant carrying gas is caused to flow at locally increased velocity, but lower than the gas velocity in said venturi throat, and said annular abutment means intercepting, and separating from the passing gas, a portion of the lubricant carried by the gas.

14. A lubricator comprising, in combination, a lubricant reservoir, a head connected to said reservoir, means in said head defining gas inlet and outlet connections, means in said head defining a venturi flow passageway between said inlet and outlet connections, the throat of said venturi being smaller than that required to pass the maximum gas carrying capacities of the inlet and outlet connections, a baffle positioned across said lubricant reservoir and spaced above the maximum level of lubricant in said reservoir, thereby defining a gas space below the baffle and above the lubricant in the reservoir, gas passageway means communicating the venturi flow passageway, upstream of its throat, with said gas space between the baffle and the lubricant, lubricant conduit means for delivering lubricant from the reservoir to the throat of the venturi flow passageway, and means including said baffle defining a by-pass passageway between said inlet and outlet connections, and around the throat of said venturi, for supplying additional gas when the demand for gas at the outlet connection exceeds a predetermined amount.

15. A lubricator comprising, in combination, a lubricant reservoir, a head connected to said reservoir, means in said head defining gas inlet and outlet connections, means in said head defining a venturi flow passageway between said inlet and outlet connections, gas passageway means connecting the venturi flow passageway at a point upstream of its throat to said lubricant reservoir to pressurize the lubricant in said reservoir, the throat of said venturi being smaller than that required to pass the maximum gas carrying capacities of the inlet and outlet connections, said venturi throat being the point at which maximum gas velocity is attained in said venturi flow passageway, means in said head defining a by-pass passageway for by-passing a portion of the gas, passing through the head between said inlet and outlet connections, around the throat of said venturi, for supplying additional gas when the demand for gas at the outlet connection exceeds a predetermined amount, and a restriction in said venturi flow passageway downstream of the throat thereof defining a constricted flow passageway disposed centrally and coaxially of said venturi flow passageway and through which lubricant carrying gas is caused to flow at locally increased velocity, but lower than the gas velocity in said venturi throat, and said annular abutment means intercepting, and separating from passing gas, a portion of the lubricant carried by said gas.

References Cited in the file of this patent

UNITED STATES PATENTS

| | | |
|---|---|---|
| 2,223,700 | Norgren | Dec. 3, 1940 |
| 2,613,067 | Goodyer | Oct. 7, 1952 |
| 2,702,094 | Maha | Feb. 15, 1955 |
| 2,762,457 | Andresen | Sept. 11, 1956 |

FOREIGN PATENTS

| | | |
|---|---|---|
| 655,008 | Great Britain | July 4, 1951 |